(12) United States Patent
Imbabi et al.

(10) Patent No.: US 12,600,668 B2
(45) Date of Patent: Apr. 14, 2026

(54) ADDITIVE FOR BLENDED CEMENT COMPOSITIONS, CEMENT PRODUCED THEREFROM AND METHODS RELATED THERETO

(71) Applicant: Carbon Capture Machine (UK) Limited, Aberdeenshire (GB)

(72) Inventors: Mohammed S. Imbabi; Fredrik P. Glasser, Aberdeenshire (GB); Lewis McDonald, Aberdeenshire (GB)

(73) Assignee: Carbon Capture Machine (UK) Limited, Aberdeenshire (GB)

( * ) Notice: Subject to any disclaimer, the term of this patent is extended or adjusted under 35 U.S.C. 154(b) by 654 days.

(21) Appl. No.: 17/294,004

(22) PCT Filed: Nov. 14, 2019

(86) PCT No.: PCT/GB2019/053230
§ 371 (c)(1),
(2) Date: May 14, 2021

(87) PCT Pub. No.: WO2020/099877
PCT Pub. Date: May 22, 2020

(65) Prior Publication Data
US 2022/0002197 A1 Jan. 6, 2022

(30) Foreign Application Priority Data

Nov. 14, 2018 (GB) ..................................... 1818580

(51) Int. Cl.
| | |
|---|---|
| C04B 22/10 | (2006.01) |
| C04B 7/02 | (2006.01) |
| C04B 40/00 | (2006.01) |

(52) U.S. Cl.
CPC .............. C04B 22/106 (2013.01); C04B 7/02 (2013.01); C04B 40/0039 (2013.01)

(58) Field of Classification Search
CPC ... C04B 14/28; C04B 22/106; C04B 40/0039; C04B 14/06
See application file for complete search history.

(56) References Cited

U.S. PATENT DOCUMENTS

| | | | |
|---|---|---|---|
| 2,164,871 A | 7/1939 | Eichenlaub | |
| 6,251,356 B1 | 6/2001 | Mathur | |

(Continued)

FOREIGN PATENT DOCUMENTS

| | | | | |
|---|---|---|---|---|
| EP | 3202743 A1 * | 8/2017 | ............. | C04B 28/02 |
| JP | 2017527516 A * | 9/2017 | ........... | C04B 28/188 |

(Continued)

OTHER PUBLICATIONS

McDonald et al. (A New, Carbon-Negative Precipitated Calcium Carbonate Admixture (PCC-A) for Low Carbon Portland Cements, Materials (Basel), Feb. 13, 2019;12(4):554. doi: 10.3390/ma12040554).*

(Continued)

*Primary Examiner* — Jun Li
(74) *Attorney, Agent, or Firm* — Robinson & Cole LLP

(57) ABSTRACT

The present invention relates to a cement additive for use in a blended cement composition, the additive comprising a precipitated calcium carbonate formed from mineral sequestration of carbon dioxide.

7 Claims, 8 Drawing Sheets

(56)  References Cited

U.S. PATENT DOCUMENTS

| | | | | |
|---|---|---|---|---|
| 2003/0051841 A1* | 3/2003 | Mathur | ................. | C01F 11/181 |
| | | | | 423/432 |
| 2013/0167756 A1* | 7/2013 | Chen | ......................... | C04B 7/34 |
| | | | | 106/789 |
| 2017/0305755 A1* | 10/2017 | Gerard | .................. | C01F 11/182 |
| 2018/0305253 A1* | 10/2018 | Ben Haha | ............. | C04B 28/025 |

FOREIGN PATENT DOCUMENTS

| | | | | | |
|---|---|---|---|---|---|
| WO | 2006/134080 | A1 | 12/2006 | | |
| WO | WO-2011107629 | A1 * | 9/2011 | ............. | B01D 53/62 |
| WO | 2018/011567 | A1 | 1/2018 | | |

OTHER PUBLICATIONS

McDonald et al., Evidence of scawtite and tilleyite formation at ambient conditions in hydrated Portland cement blended with freshly-precipitated nano-size calcium carbonate to reduce greenhouse gas emissions, Journal of Building Engineering 48 (2022) 103906.*

International Search Report and Written Opinion mailed Feb. 20, 2020 in corresponding PCT application No. PCT/GB2019/053230.

* cited by examiner

FIG. 2

| NANO CALCITE | Hydration Time | | | |
|---|---|---|---|---|
| | 1 Day | 3 Day | 7 Day | 28 Day |
| C3S | 0.2486 | 0.1517 | 0.1055 | 0.0478 |
| C2S | 0.1947 | 0.1927 | 0.1744 | 0.165 |
| C3A | 0.0503 | 0.0305 | 0.0206 | 0.006 |
| C4AF | 0.0477 | 0.0363 | 0.0221 | 0.0104 |
| Calcite | 0.1482 | 0.1383 | 0.1303 | 0.1019 |
| Ca(OH)2 | 0.1009 | 0.1413 | 0.1774 | 0.211 |
| MICRO CALCITE | Hydration Time | | | |
| | 1 Day | 3 Day | 7 Day | 28 Day |
| C3S | 0.2821 | 0.2369 | 0.1457 | 0.0956 |
| C2S | 0.1980 | 0.1940 | 0.1869 | 0.1720 |
| C3A | 0.0803 | 0.0586 | 0.0293 | 0.0102 |
| C4AF | 0.0494 | 0.0387 | 0.0268 | 0.0150 |
| Calcite | 0.1490 | 0.1432 | 0.1395 | 0.1323 |
| Ca(OH)2 | 0.0865 | 0.1243 | 0.1429 | 0.1874 |
| OPC | Hydration Time | | | |
| | 1 Day | 3 Day | 7 Day | 28 Day |
| C3S | 0.2951 | 0.2694 | 0.1856 | 0.1232 |
| C2S | 0.1997 | 0.1968 | 0.1921 | 0.1802 |
| C3A | 0.0858 | 0.06545 | 0.0339 | 0.0212 |
| C4AF | 0.0494 | 0.0415 | 0.0299 | 0.0186 |
| Ca(OH)2 | 0.0657 | 0.1106 | 0.1249 | 0.1683 |

FIG. 8

ADDITIVE FOR BLENDED CEMENT COMPOSITIONS, CEMENT PRODUCED THEREFROM AND METHODS RELATED THERETO

The present invention relates to additives for use in blended cement compositions, cement produced therefrom and methods related thereto.

In this regard, Portland cement production now accounts for around 7% of anthropogenic $CO_2$ emissions and production is expected to rise further in the coming years requiring action to be taken to reduce emissions.

Calcareous materials, such as limestone, are additives used to reduce the environmental impact of the cement production process as a partial substitute for clinker and moreover provide benefits to workability, durability, hydration and strength. That said, the role of calcium carbonate within cement production is generally considered on a superficial level to be predominantly that of a filler, with a maximum permitted level of 5% by weight.

Furthermore, these materials themselves require resources and energy before use, emitting $CO_2$ in the process.

According to the present invention there is provided a cement additive for use in a blended cement composition, the additive comprising: a precipitated calcium carbonate formed from mineral sequestration of carbon dioxide. In this regard, the cement produced from such a composition has been found to exhibit particularly enhanced strength characteristics and reduced embodied $CO_2$ values with respect to known cement compositions and cements formed therefrom. The particular morphology of the precipitated calcium carbonate, as well as the size and shape of the particles and the particle size distributions are controllable to afford a high quality, high performing alternative to conventional cement additives.

In this connection, the conditions of precipitation are controlled in the formation process to produce the desired size and shape of the particles and the particle size distributions.

Preferably, the calcium carbonate is calcite. Conveniently, the particle size of the calcium carbonate is substantially in the range of 0.8 micron to 1.5 microns.

Preferably, the calcium carbonate is a mixture of amorphous and calcite solids. Conveniently, the particle size of the calcium carbonate is nano-sized.

In this respect, such forms of calcium carbonate are configured to react with Portland cement is a manner to enhance their usage within the cement composition.

Preferably, the cement additive further comprises silica. The silica may take any form that is capable of reacting with cement. In this respect, the silica is preferably configured to have high surface area to enhance such reaction and may, for example, be selected from one or more of quartz dust, silica fume or silica gel. In this manner, by way of the introduction of silica, the properties of the cement composition are enhanced.

Preferably, the precipitated calcium carbonate is provided in the range 1 to 25 wt. % within the blended cement composition.

Conveniently, the precipitated calcium carbonate is provided in the range 10 to 15 wt. % within the composition.

Preferably, the precipitated calcium carbonate is substantially 12.5 wt. % within the composition.

Preferably, the calcium carbonate is precipitated under controlled conditions.

According to a further aspect of the present invention there may be provided a cement admixture comprising a precipitated calcium carbonate additive as defined above.

According to a further aspect of the present invention there is provided cement comprising a precipitated calcium carbonate additive as defined above.

According to a yet further aspect of the present invention there is provided a method of changing the mineralogy of a hydrated cement, by introduction of amorphous calcium carbonate, a reaction between the cement and amorphous calcium carbonate resulting in the formation of calcium carbonate silicate (hydrates) including either or both of scawtite and tilleyite by a spontaneous and internal reaction.

According to a yet further aspect of the present invention there is provided a method of changing the mineralogy of a hydrated cement by introduction of nano-crystalline calcium carbonate, a reaction occurring between the cement and the nano-crystalline calcium carbonate.

Preferably, the cement is Portland cement.

According to a further aspect of the present invention, there is provided a method of making reactive and amorphous calcium carbonate by capturing gaseous emissions from one or more cement plants and from said gaseous emissions converting carbon dioxide to carbonate and bicarbonate ions in aqueous solution and precipitating calcium, magnesium carbonates and carbonate hydrates.

Preferably, the precipitated calcium carbonate is added to a cement composition to reduce the cement content of cement products.

According to a further aspect of the present invention there is provided a method of manufacturing cement; comprising: forming a cement admixture having an additive comprising a precipitated calcium carbonate; and adding water to form a slurry.

Preferably, the precipitated calcium carbonate is substantially 1 to 25 wt. % within a blended cement composition in which the admixture is used.

Conveniently, the precipitated calcium carbonate is substantially 10 to 15 wt. % within a blended cement composition in which the admixture is used.

Preferably, the precipitated calcium carbonate is substantially 12.5 wt. % within a blended cement composition in which the admixture is used.

As such, the compressive strength of the cement produced thereby is substantially up to 55 MPa.

In the preferred embodiments, the blended cement mixture is cured at ambient temperature.

Embodiments of the present invention will now be described by way of example and with reference to FIGS. 1 to 4 of the accompanying drawings, of which:

FIGS. 1(*i*) to (*v*) show SEM images of test samples in relation to the present invention;

FIG. 2 shows a graph of compressive strength of precipitated calcium carbonate cement blends at 7 and 28 wet curing days according to the present invention;

FIGS. 4 to 7 relate to different examples for increasing carbonate activity according to the present invention; and FIG. 8 shows the progress of hydration arising from the addition of active calcium carbonate to Portland cement according to the present invention.

Figure 1:
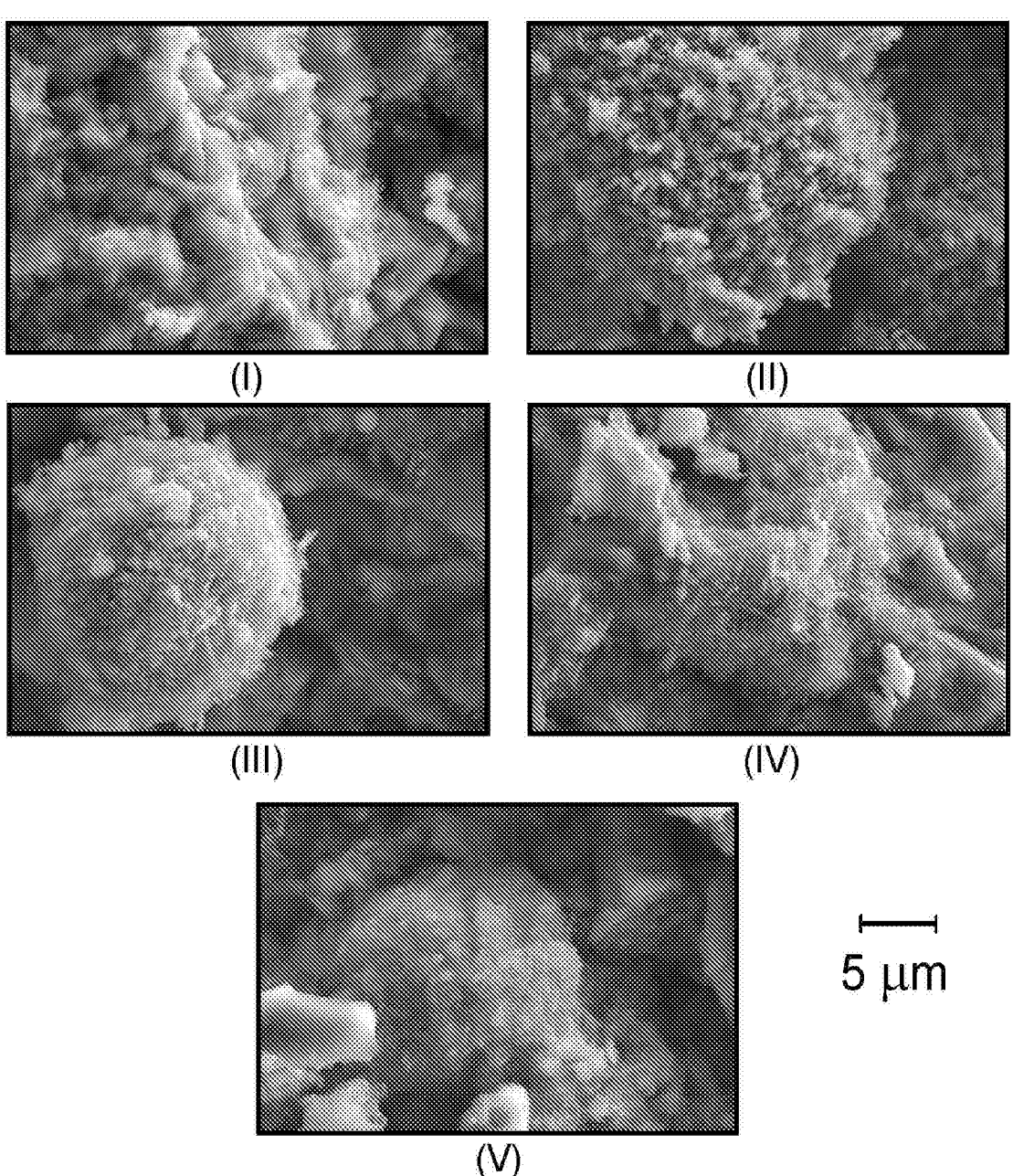

In this connection, FIG. 1 illustrates scanning electron microscope (SEM) images of test samples (i) Ordinary Portland cement fractography, (ii) precipitated calcium carbonate (PPC) (iii) 5% PPC cement fractography (iv) 10% PCC and (v) 15% PCC.

As such, the microstructure of the PCC and the PCC cement can be seen compared with that of Ordinary Portland cement.

A method for manufacturing PCC for use in the present invention is disclosed in WO2018/011567.

In a test, cement paste test samples of CEM I 52.5N cement were prepared with varying PCC contents (0 to 15 wt. %), added as a slurry to achieve a w/c of 0.5. The samples were wet cured at ambient temperature for 7 & 28 days.

The microstructure of the cured PCC and PCC blended cement can be seen in FIG. 1. As such, for 7 day curing time, compressive strength was found to be increasing up to substantially 3% PCC before decreasing steadily.

Figure 2:
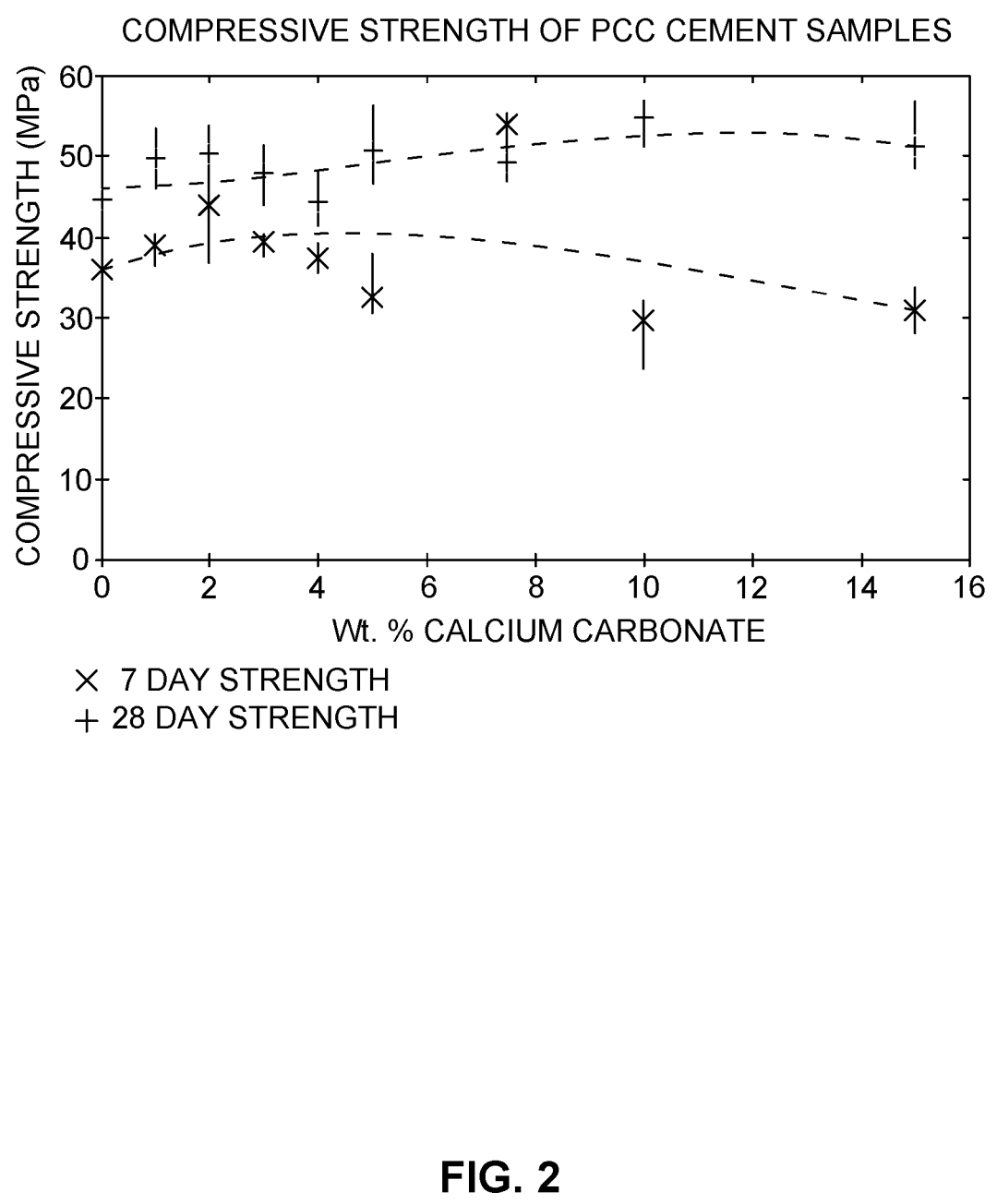

For 28 days cure time, the strength is seen to increase up to substantially 10% PCC with a strength of 55 MPa as seen in FIG. 2.

To this end, it has been established that substantially 10% PCC has the greatest reduction of embodied $CO_2$, by 42%, due to clinker factor reduction, increased strength and $CO_2$ sequestered in the production of PCC.

Replacing the known additives with carbon negative precipitated calcium carbonate (PCC) has been found significantly to enhance the sustainability of cement production.

In this regard, calcium carbonate is conventionally added to cement in the form of inter-ground limestone. Typically, cement clinker and crushed limestone are blended and the surface area of the mixed solids increased during the grinding stage. The surface area is generally several thousand $cm^2/g$. A wide range of particle sizes is produced, but typically, the limestone component, being softer than clinker, is finer. The role of calcium carbonate was traditionally regarded as being a "filler": that is, it does not react with cement in the course of hydration but it fills space which might otherwise be empty chemically with PC. Most national standards allow up to 5% $CaCO_3$ to be added and still be marketed as Portland cement. Other classes of cement, usually described as "blended Portland cement" are also allowed. But the modern change, to allow up to 5% in "Portland cement", the main article of commerce, has resulted in substantial savings in $CO_2$ emissions.

The applicants have established that this view that limestone, $CaCO_3$, does not react with Portland cement (PC) is not correct but that a chemical reaction occurs between fresh PC and calcium carbonate. Hydrated cement contains a phase designated AFm. It's normal composition is based on layers of composition $Ca_2Al(OH)6+$ with the interlayer spaces containing a charge balancing anion as well as water molecules. Thus, cements formulated with calcium carbonate give amongst the hydration products, two AFm type phases designated "hemicarboaluminate" and "monocarboaluminate" with the approximate molar ratios $4CaO \cdot Al_2O_3 \cdot 0.5CaCO_3 \cdot 12H_2O$ and $4CaO \cdot Al_2O_3 CaCO_3 \cdot 11H_2O$ respectively: carbonate ions are inserted in place of OH and other ions for charge balance. Cements made without calcium carbonate contain AFm phase(s) but their interlayer contents are mixtures of OH and $SO_4$ anions. This capacity, to form carbonate-containing AFm phases in the physical presence of calcium carbonate means that some of the added calcium carbonate reacts chemically with cement, reducing the amount of unconsumed calcium carbonate. Reaction of calcium carbonate with PC begins shortly after cement hydration begins, usually within days at ~20 degrees C.

Thus, the applicants have identified that a proportion of the calcium carbonate combines with PC hydration product: meaning that added $CaCO_3$ has a dual role, as a reactive admixture and as a filler.

Other minor sources of reaction occur such as limited replacement of (OH, $SO_4$) in the AFt (or ettringite-like phase) but such substitutions are minor. Overall, the amount of calcium carbonate which behaves as reactive admixture is small: depending on cement composition and probably 1 to 4 weight %.

Further reaction between carbon dioxide and/or carbonate ions is possible. Some reaction has long been known: for example, if cement is exposed to carbon dioxide, as occurs upon exposure to air containing, nominally 410 ppm $CO_2$, the much higher activity of carbon dioxide reacts with and carbonates all the cement substances, giving mixtures of calcium carbonate with alumina and silica gel. This is not desirable though, as the high pH characteristic of cement hydration solids in contact with water is lost and with that loss, embedded steel is no longer passivated.

The present invention is concerned with reaching an intermediate state of reaction in a controlled manner. In such an intermediate state a greater amount of calcium carbonate can react and become part of the binder matrix.

Figure 3:
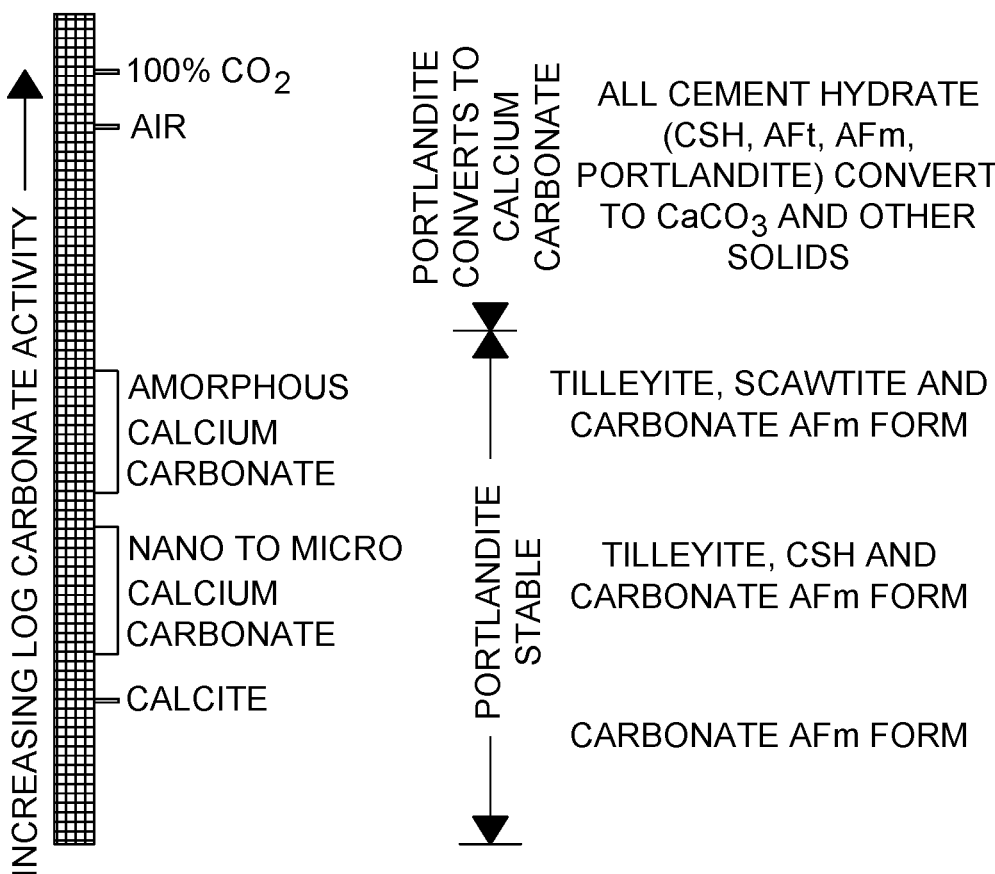
FIG. 3 shows schematically the relative ranking of nano-calcite and of ACC on a scale of carbonate activity.

In this connection, FIG. 3 shows a carbon dioxide activity scale showing corresponding mineralogical changes resulting from activity changes. The low activities characteristic of Portland cement clinker project near the bottom of the scale. Adding calcium carbonate in the form of ground limestone somewhat raises the carbonate activity and, as a consequence, calcium carboaluminate hydrates the so called AFm type phases, are developed. Exposure to air or $CO_2$ gas raises carbonate activities towards the top of the scale and all cement phases are carbonated. Intermediate states, can in this respect be accessed by controlling the activity of the calcium carbonate. These intermediate states bind more carbonate but do not destroy CSH or Portlandite.

The intermediate state does not as such result in carbonation of Portlandite or CSH (calcium silicate hydrate) and retains the high pH characteristic of PC. To achieve this state, it is desired to increase the activity of carbon dioxide to an intermediate level so as to raise the binding capacity of the cement for $CO_2$, but not totally carbonate it.

This new regime involves development in the matrix of calcium carbonate silicates, either or both tilleyite, $Ca_5(Si_2O_7)(CO_3)$ and scawtite, $Ca_7(Si_3O_9)(CO_3)2H_2O$, containing respectively 18.0 and 7.3 wt % $CO_2$. Their formation in a cement being cured at ambient temperature conditions is previously unknown.

These phases, tilleyite and/or scawtite, are markers, their development is responding to a new regime of higher carbonate activity, higher than can be attained using the main crystalline form, calcite.

At the same time, the hydration of cement clinker is accelerated.

The formation of scawtite and tilleyite, both of which are relatively silica rich, reduce somewhat the availability of silica to form calcium silicate hydrate, so the overall paste mineralogy is affected with concomitant impact on space filling by the paste.

By virtue of their formation, scawtite and tilleyite increase the ability of the cement paste to react with and consume free calcium carbonate. Thus, more of the calcium carbonate becomes a reactive admixture and the critical % of $CaCO_3$ necessary to add before $CaCO_3$ becomes a filler is thereby increased.

Moreover, from testing carried out to date, it appears the properties of the concrete are conserved and even enhanced. There is moreover an energy saving attendant on the use of calcium carbonate.

There are advantages to using calcium carbonate. First, as will be shown, it can be made from $CO_2$ captured during the manufacture of cement clinker thereby reducing emissions to the atmosphere.

Both scawtite and tilleyite are known from natural occurrences. Typically, they occur at or near the contact zone between intruded or extruded molten rock and impure limestone. This contact may occur, for example, where molten rock is intruded into or through impure limestone. Their origin does not necessarily indicate a high temperature origin as the rocks have had a long and slow cooling period during which steam and waster may have infiltrated. Typically, they occur together with other minerals which are also known to occur during hydration of PC during normal and elevated temperature cure, e.g, tobermorite and CSH gel. Tilleyite and scawtite are however not normal constituents of PC paste made with added calcium carbonate. In accordance with the present invention, scawtite and tilleyite are stabilised in PC by controlling elevated carbonate activity as shown in FIG. 3: elevation is relative to ground limestone.

The present invention thus enables control and uniformly necessary to enhance reaction between cement hydration products and ensures the calcium carbonate reaction is internal and occurs simultaneously throughout the mass of hydrating cement.

However, if the activity of carbonate can be raised above the calcite threshold attained by ground limestone, other reactions become possible. For example, and to take an extreme case, cement may be exposed to air. Air contains about 410 ppm carbon dioxide and its reacts with alkaline cement to form carbonate ions. This rise in carbonate activity is large on the scale of FIG. 3 and is sufficient to carbonate all the cement phases. While much carbon dioxide is bound into solids, the intrinsic high pH of cement is also destroyed. This has consequences to the stability of composites made with concrete. For example, embedded steel is passivated against corrosion by high pH of fresh cement. Adding limestone or calcite does not affect the high pH: $Ca(OH)_2$ and CSH remain to condition the high matrix pH. So the composite is stable. However, if the high pH is destroyed, passivation is lost and the steel becomes liable to corrode.

The present invention concerns the fact that (i) intermediate regimes of carbonation occur between on the one hand, that attained by adding calcite and on the other, that achieved in air, (ii) that the intermediate regimes have high pH, as evidenced by preservation of portlandite and CSH, (iii) that by way of the present invention, it is possible to access the intermediate states easily and consistently by developing highly active forms of calcium carbonate (iv) that the active forms of calcium carbonate become part of the matrix mineralogy and are not just fillers and (v) the active forms of calcium carbonate can be made, if desired, by capturing $CO_2$ arising from the cement making process.

This new and desirable regime is characterised by the appearance of one or both calcium silicocarbonates, scawtite and tilleyite.

In general, the applicants have identified three methods of raising the carbonate activity above the threshold necessary to form tilleyite and scawtite. The first two of these are achieved by (i) adding carbonate in soluble form such as by using an alkali carbonate, (ii) adding $CO_2$ gas or $CO_2$ dissolved in solutions so that the added $CO_2$ reacts with OH ions furnished by cement to form carbonate ions. Both these first routes are considered unsatisfactory. The first involves adding a soluble ion, necessary to charge balance the charge on carbonate: Sodium, in the form of sodium carbonate, is an example. But sodium- and indeed any other soluble ion—is not wanted in cement for technical reasons while the second method is uncontrollable in practice. Even when air (nominally with dilute $CO_2$, 410 ppm $CO_2$) it locally elevates carbonate activity to near the top of the scale shown in FIG. 3 and all cementing phases are thereby destabilised, forming $CaCO_3$ and other appropriate hydrous oxides. The high pH of cements is lost and, as noted, embedded steel loses the normal passivation it attains in un-carbonated cement. The third method, according to the present invention, involves means whereby the activity of carbonate can be raised, and sufficient mass of carbonate is delivered to form carbonate silicates such as scawtite and tilleyite, while at the same time, not attaining carbonate activities sufficient to destabilise the portlandite and CSH contents.

The system is thus controlled by formulation and is otherwise self-regulating. For example, reaction stops spontaneously at a chemically buffered state that permits much carbonate to become part of the binder mineralogy than can be achieved by using calcium carbonate in the form of ground limestone while still preserving the high pH condition arising from the stable persistence of Portlandite and CSH. Preservation of CSH is of importance because it is believed to contribute to the strength.

Figure 4:
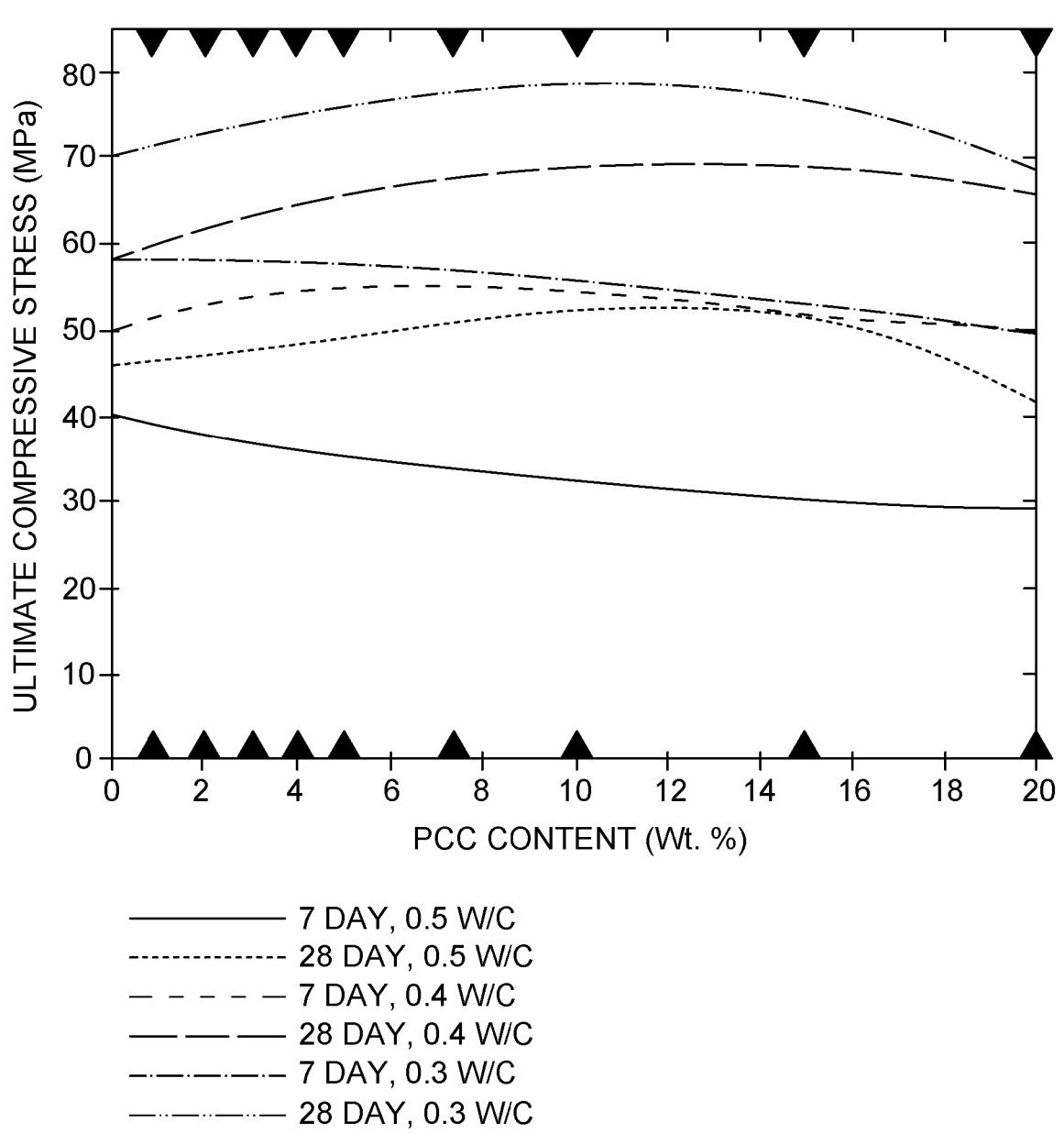
Figure 5:
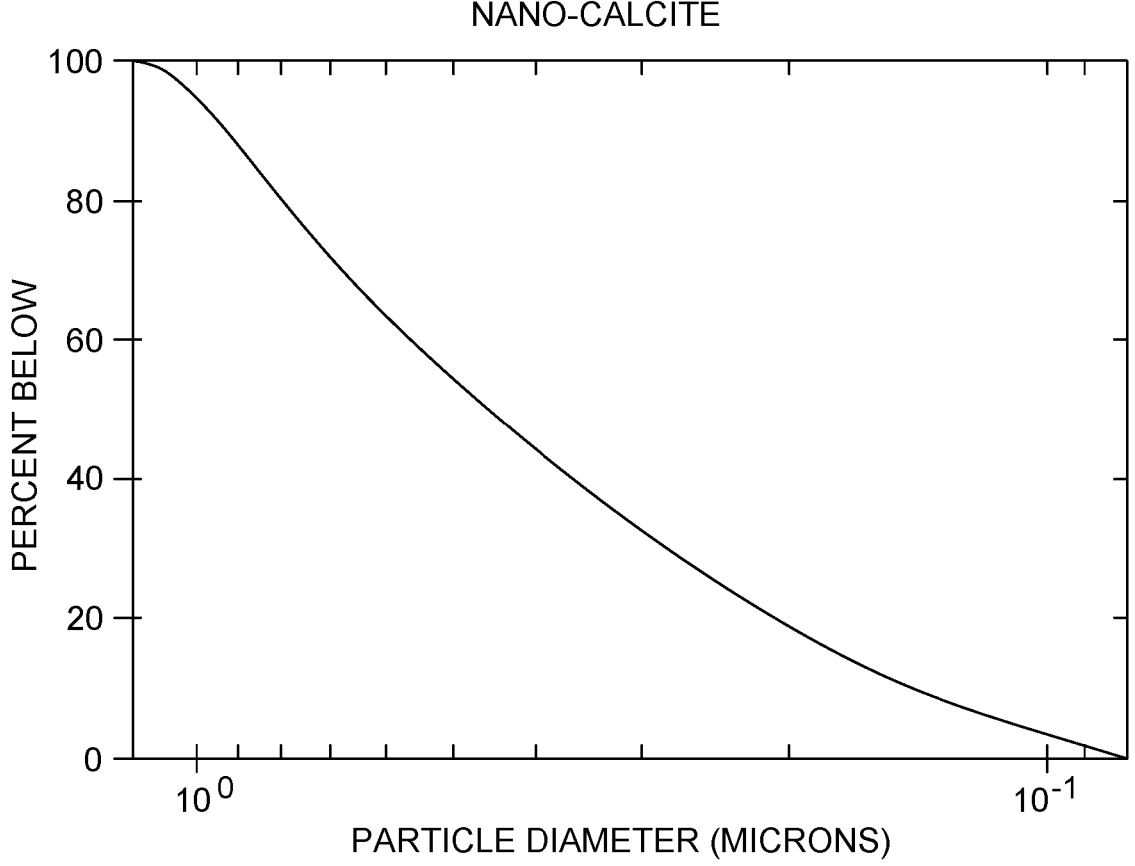

The present invention concerns two such embodiment systems shown in FIGS. 4 to 7. One is achieved by adding nano-calcite as shown in FIGS. 4 and 5, the solubility of which is significantly greater than that of normal micro- or macroscale particles, and which is sufficiently active to form carbonate silicate, e.g., tilleyite, and a second embodiment system shown in FIGS. 6 and 7, comprised of amorphous calcium carbonate (abbreviated ACC), which is also sufficient to condition formation of tilleyite and sawtite.

In this connection FIG. 4 shows unconfined compressive strength development in paste cubes made with nano-calcium carbonate. Isopleths were studied at carbonate replacement levels shown by the solid triangular markers (top and repeated at the bottom). Each data point was determined in triplicate and the mean value of the three individual determinations was used to generate the continuous curves formed by linking the means.

FIG. 5 then shows a log scale particle size distribution of nano sized calcite. The samples have a D50 size of 430 nm. The nano-calcite was produced by the method described below. The sole calcium carbonate polymorph identified in the sample is calcite.

Figure 6:
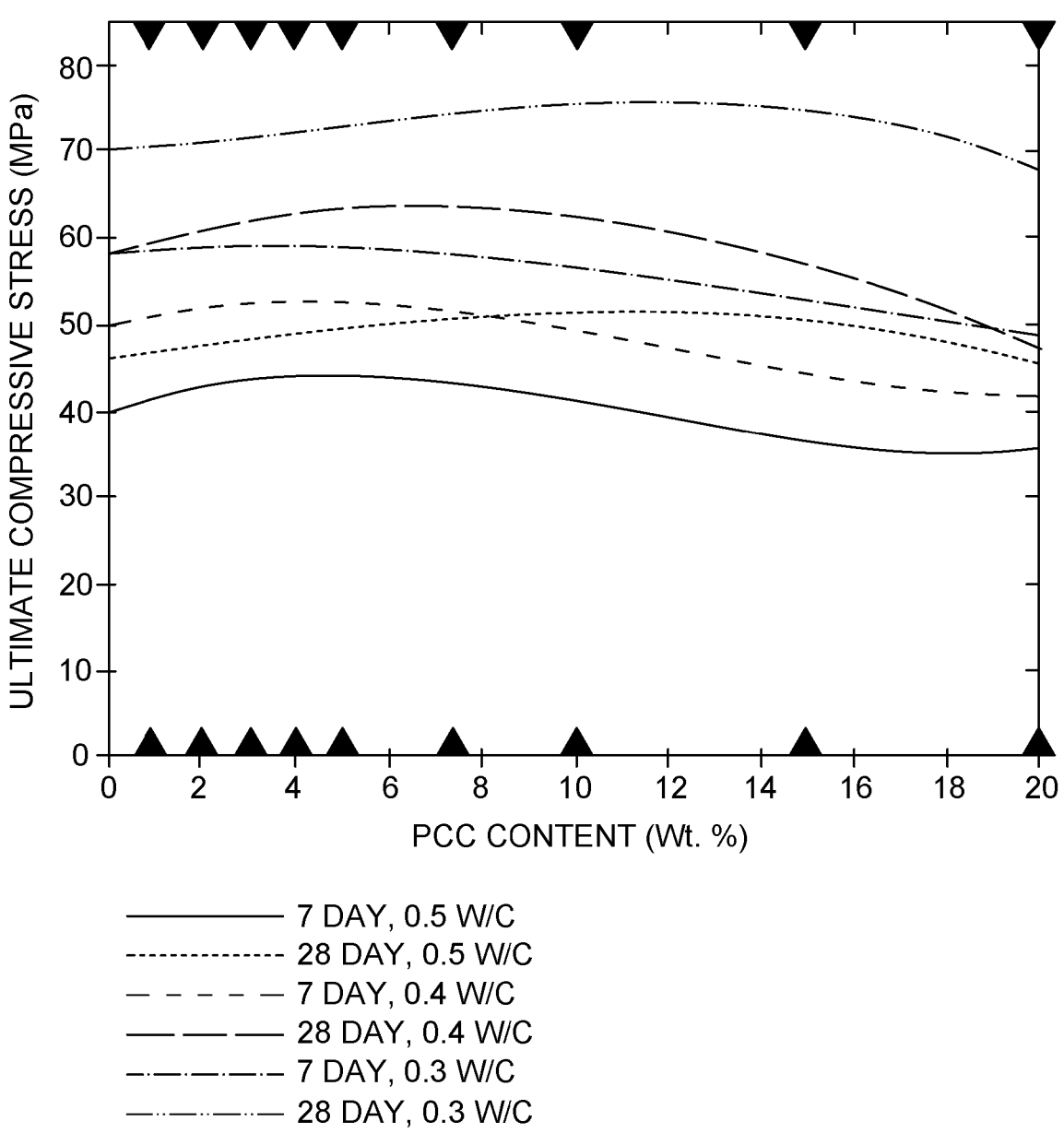
Figure 7:
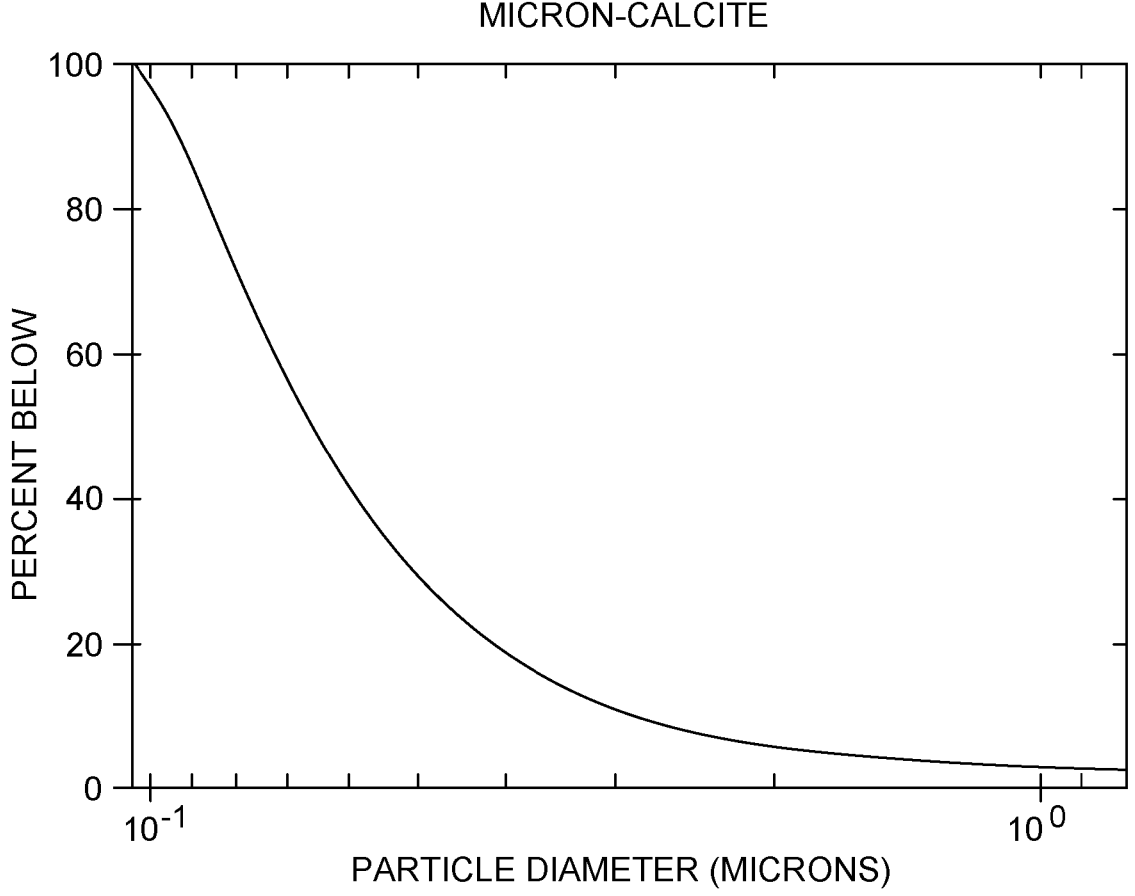

FIG. 6 shows unconfined compressive strength development in paste cubes made with micron scale calcite and FIG. 7 shows the particle size distribution of the calcite. In this regard, FIG. 7 shows a log scale particle size distribution of microscale calcium carbonate. The samples have a D50 size of 6.3 μm. The material was produced as described below with a standing time of 30 minutes to allow the crystals to grow to size.

FIG. 3 shows schematically the relative ranking of nano-calcite and of ACC on a scale of carbonate activity. Crystalline calcite is a phase of constant composition and therefore has a fixed position on the scale. Both nano-calcite and ACC have generally higher solubilities, which can be equated with activity, but may be either variable in composition or differ in degree of structural organisation or both and consequently exhibit ranges of activity rather than a single value. Nevertheless, nano-calcite and ACC have distinctively different activities, or ranges of activity and the consequence is that they react to different quantitative extents and form distinctively different products in mixtures with Portland cement, relative to a crystalline calcite benchmark. This is of because of the nature of the material: the greater solubility of nanoparticles increases rapidly as the size decreases and the amorphous state is capable of having different degrees of amorphousness. But either nano or ACC or mixtures thereof are sufficient to stabilise carbonate silicates.

In mixtures of solid phases, the carbonate activity of the mixture is dominated by the phase with the highest carbonate activity thus the claimed action does not require phase-pure products: mixtures of particle sizes and crystallinities are sufficient to accomplish the desired reactions.

Thus the carbonate activity of cement is raised such that its binding capacity for $CO_2$ is increased, but (i) without adding cations other than calcium and (ii) without destroying the Portlandite and the calcium silicate hydrogel (shorthand CSH), which acts as the main binder and, jointly with portlandite, comprise the main reservoir or source of OH ions necessary to maintain high internal pH. The supply of portlandite ($Ca(OH)_2$ is also conserved.

Thus the high internal pH characteristic of Portland cement is preserved and remains well buffered. Thus the buffering reserve of a concrete, necessary to preserve high internal pH in aggressive service conditions, is not impaired. Moreover, the reaction of nano-calcite and/or ACC with Portland cement is self-limiting and does not require complex controls or depend on complex processing for its beneficial action: It is simply necessary to determine the optimum mix proportions and batch the concrete accordingly.

An additional aspect arises from the addition of amorphous calcium carbonate (AC) and nano $CaCO_3$; such addition can accelerate hydration of the main clinker components. While initial and final set times are broadly unaffected by the additives, hydration of the main clinker components is accelerated especially in the period 1 to 28 days, with the result that early strength gain is more rapid relative to a Portland cement benchmark.

By reacting with silica and calcium liberated in the course of early hydration, formation of protective layers of hydrate product around clinker grains is inhibited or disrupted and water is more readily able to access the un-hydrated clinker minerals.

Likewise, the benefit of siliceous additives such as amorphous or low crystallinity (glassy) silica and zeolites, calcined clay or fly ash, may also enhance reaction between Portland cement and active forms of calcium carbonate. These ternary additions further enhance the scope for clinker substitution and decreasing the carbon emissions of concrete.

The question may also arise about what happens to nano- and micro calcium carbonate which do not react. Amorphous calcium carbonate crystallises slowly (weeks, months) and nano and micro scale calcite gradually coarsen to above a micron so behave as "normal" calcium carbonate.

As such, with the present invention the beneficial impacts of calcium carbonate additives can be enhanced by using micro- and nano-size particles and that the specific benefit of using amorphous and nanocrystalline forms of $CaCO_3$ is to promote formation of calcium carbonate silicates such as scawtite and tilleyite.

Moreover, the two effects: enhanced reactive calcium carbonate and the small particle effect which it acts as a filler are considered to be synergistic.

Further, the beneficial effects of more rapid hydration will be enhanced using all Portland cement compositions but especially effective with siliceous additives used in Portland cements formulated with reactive calcium carbonate. The increase in reactivity of nano and micro calcium carbonate and of ACC enable more calcium carbonate to become part of the matrix. This creates technical benefit and lowers the carbon footprint especially if the relevant forms of calcium carbonate are made by capture of $CO_2$ recovered form cement kiln exit gas.

The table shown in FIG. 8 shows the progress of hydration arising from the addition of active calcium carbonate to Portland cement. The cubes were made to a uniform water: solid ratio of 0.40 and cured under water at 20 degrees C. The determination of phase content is by X ray diffraction with full Rietveld refinement. Where values are given to 4 places of decimals, the last two are not significant and were 3 are given, the last value is not significant. The phase totals do not add up to 100% because the amorphous phase or phases, mainly CSH, are not measured. Of the phases tabulated, C3S and C2S, C3A and ferrite are progressively disappearing by reaction with water while $Ca(OH)_2$, a hydration product, increases with time. It can be seen that micro and nano-calcite (the latter also containing amorphous calcium carbonate) accelerate hydration more strongly with nano-calcite showing the strongest acceleration. The amounts of calcium hydroxide increase with time and as hydration progresses but the amount of calcium hydroxide is also affected by formation in the calcium carbonate-containing samples by the development of scawtite and/or tilleyite.

Chemical Analysis of the Portland Cement and its Calculated Mineralogy. [Data Supplied by the Manufacturer]

The amorphous calcium carbonate is washed to reduce the chloride content of washings to <0.05% to less, and the amorphous phase used immediately as wet slurry or dried and kept until point of use. If wet slurries used the water content of the slurry is needed to maintain the desired water/cement weight ratio of the mix.

Dry powder may be used, batching the water to the desired water/cement ratio. Mixing with low or high shear is sufficient to disperse the amorphous calcium carbonate through the mix. When used in the form of a wet slurry, the active calcium can be mixed with Portland cement, water and other mix components as specified in the mix design, correcting water content to take into account water in the slurry. Handling and mixing may be done in the temperature range 1 degree C. to 40 degrees C. If the rheology of fresh cement needs to be adjusted, conventional commercial plasticisers or super-plasticisers may be used. The fresh mixes may be emplaced by any standard methods such as poring, pumping or spraying. After emplacement, the mix is treated according to relevant best practice models and applicable codes. The extent of substitution of Portland cement by reactive calcium carbonate may range between 0 and 50%, but preferably lies in the range 5-25%.

All samples of active calcium carbonate, when added to Portland cement at >5% replacement and hydrated at 20 degrees C., develop stratlingite upon curing for more than a few days at ~20 degrees C. Once formed, it is persistent. It is supposed that the high carbonate activity stabilised a carbonate-substituted variant of stratlingite-vertumnite-like layer structures. The exact structure type and extent of carbonate substitution is not known. It's identification is by X ray powder diffraction.

Adding sodium carbonate to fresh cement results in the development of, among other things, scawtite. Sodium remains partly soluble: it is effectively converted to NaOH in the course of removing carbonate. This generates a very high internal pH which is also potentially damaging to mineral aggregates containing free silica. This reaction, termed an alkali-silica reaction, is often avoided by limiting the alkali (Na, K) content of cement. It is not proposed to add alkali carbonates, hence the emphasis on calcium, which in innocuous. High levels of potentially soluble free alkali in cement also promote unsightly efflorescence in cement-based constructions. This is avoided by using calcium as the counter-ion.

The particle size distribution of the micro and nano-scale calcium carbonate precipitates was determined using independent methods (i) scanning electron microscopy (ii) lased particle size analysis and (iii) by X ray diffraction, using the Scherrer equation to relate line broadening to particle size (results presented elsewhere in the text). Method (iii) technically determines crystallite size and does not give assurance about agglomeration but a good correlation between results of method (iii) with other methods suggests that particles are generally comprised of individual crystallites. Manufacture of Nanoscale Particles of Calcite, Calcium Carbonate.

In support of this, two processes for to making nanoscale $CaCO_3$ are provided.

Process One.

Two aqueous solutions are made, termed solution A and B. Solution A is made from technical grade $CaCl_2$ and has a concentration of 1.25M $CaCl_2$). Solution B is an aqueous solution of sodium carbonate 1.25M with respect to $Na_2CO_3$, sodium carbonate. The two solutions are mixed at 20 degrees C. using constant output peristaltic pumps to ensure constant delivery rates. The output from the pumps are led to a third vessel, vessel C, which is continuously and rapidly stirred. When working on a batch basis, the addition process is adjusted to take about 10 minutes. Alternatively, the process may operate continuously. On a batch basis and at the conclusion of the mixing stage, the mixed solution vessel C, now containing a precipitate dispersed in an aqueous solution of NaCl, is vacuum filtered, washed by successive portions of tap water and finally dried in an oven at 120 degrees C. in air. The resulting precipitate consists mainly of micro of calcite. Application of the Scherer equation to this X ray diffraction pattern indicates a mean crystallite size of 149 nm.

Process Two

This process uses the same method of addition but the brine solution contained 1.69 parts (by moles) of Mg to one part Mg. The carbonate source is 1M $NaHCO_3$. This method produces the finest particle size, crystallite size. 65.6 nm, but yields are distinctly less than in process 1. The product was allowed to stand in contact with mother liquor for 4 minutes prior to commencing filtration and washing and the product was dried for 18 hours at 40 degrees C. By XRD the product has a high amorphous content and some nanocalcite.

The brine component can contain zero to high Mg content although at the highest Mg content used, the alkalinity has to be kept low (by using $NaHCO_3$) to avoid co-precipitating phases containing essential Mg. At zero to low Mg contents, the pH of the precipitating solution can be increased without also forming Mg impurity solids and the overall Ca recovery rate improved by more complete precipitation and, moreover, the higher alkalinity of mixtures of $Na_2CO_3/NaHCO_3$ compare to $NaHCO_3$, requires less volume of carbonate solution to achieve good recovery.

One factor limiting the formation of scawtite and tilleyite is the low availability of silica. Portland cement typically contains upon bulk analysis, 20-24% silica. This silica has to be partitioned between CSH, stratlingite, tilleyite and scawtite with the result that scawtite and tilleyite comprise only a small fraction, ca 10% of the bulk paste.

One way of increasing the silica availability is to use a clinker high in belite. Another way, applicable to cements with low silica content, is to add silica in reactive form. Very high surface area quartz is commercially available but on account of health hazards arising from quartz dust, the use of, for example, silica fume is preferred. In the context of the present invention, this is commercially available and does not present significant hazard and is any event quickly and totally reacted with cement within days.

In a further aspect of the present invention the silica content can as such be raised to enhance the formation of scawtite and tilleyite. In this regard, the objective is not just to produce more scawtite and/or tilleyite, but to increase the potential of Portland cement to react with calcium carbonate and thereby reduce emissions of $CO_2$ to the atmosphere by first capturing $CO_2$ and then using it to reduce the amount of cement needed per unit volume An advantage of the present invention is that the calcium carbonate polymorph can be controlled to suit the requirements. Moreover, the size and shape of particles as well as the particle size distributions can be controlled to suit the circumstances.

The invention claimed is:

1. A method of changing the mineralogy of a blended cement composition, the method comprising:

forming a precipitated calcium carbonate from mineral sequestration of carbon dioxide, the precipitated calcium carbonate being amorphous calcium carbonate or crystalline calcium carbonate having a particle size of 149 nm to 430 nm;

introducing the amorphous calcium carbonate, or the crystalline calcium carbonate to the blended cement composition, the blended cement comprising Portland cement and the precipitated calcium carbonate being in the range 1 to 25 wt. % based on a total weight of the blended cement composition;

raising a level of carbonate activity above a threshold necessary to form tilleyite and scawtite;

wherein the raising the level of carbonate activity results in an intermediate activity between the threshold and the carbonate activity in which all hydrated cement phases of the group consisting of hemicarboaluminate, monocarbialuminate, ettringite, calcium silicate hydrate and Portanlandite are carbonated by exposing the blended cement composition to air; and forming tilleyite and scawtite in the blended cement composition at approximately 20 Celsius degree.

2. A method of changing the mineralogy of a blended cement composition, the method comprising:

forming a precipitated calcium carbonate from mineral sequestration of carbon dioxide, the precipitated calcium carbonate being crystalline calcium carbonate having a D50 particle size of 6.3 microns;

introducing the crystalline calcium carbonate to the blended cement composition, the blended cement comprising Portland cement and the precipitated calcium carbonate being in the range 1 to 25 wt. %, based on a total weight of the blended cement composition;

raising a level of carbonate activity above a threshold necessary to form tilleyite and scawtite;

wherein the raising the level of carbonate activity results in an intermediate activity between the threshold and the carbonate activity in which all hydrated cement phases of the group consisting of hemicarboaluminate, monocarbialuminate, ettringite, calcium silicate hydrate and Portanlandite are carbonated by exposing the blended cement composition to air; and forming tilleyite and scawtite at approximately 20 Celsius degree.

3. A method of changing the mineralogy of a blended cement composition, the method comprising:

forming a precipitated calcium carbonate from mineral sequestration of carbon dioxide thereby producing amorphous calcium carbonate;

introducing the amorphous calcium carbonate, to the blended cement composition, the blended cement composition comprising Portland cement and the precipitated calcium carbonate in the range 1 to 25 wt. % based on a total weight of the blended cement composition;

raising a level of carbonate activity above a threshold necessary to form tilleyite and scawtite;

wherein the raising the level of carbonate activity results in an intermediate activity between the threshold and the carbonate activity in which all hydrated cement phases of the group consisting of hemicarboaluminate, monocarbialuminate, ettringite, calcium silicate hydrate and Portanlandite are carbonated by exposing the blended cement composition to air; and forming tilleyite and scawtite at approximately 20 Celsius degree.

4. The method of claim 3, wherein a produced cement after changing the mineralogy of the blended cement composition, has a compressive strength of up to 55 MPa.

5. The method of claim 3, further comprising curing the tilleyite and scawtite in the Portland cement.

6. The method of claim 3, wherein the air comprising 410 ppm carbon dioxide.

7. The method of claim 3, wherein the changing the mineralogy of a blended cement composition comprises adding siliceous additives for clinker substitution.

* * * * *